US009048472B2

(12) United States Patent  
Paganelli

(10) Patent No.: US 9,048,472 B2  
(45) Date of Patent: Jun. 2, 2015

(54) FUEL CELL SHUT-DOWN PROCEDURE INCLUDING VAPORIZATION PHASE

(75) Inventor: Gino Paganelli, Beelfaux (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1145 days.

(21) Appl. No.: 12/214,222

(22) Filed: Jun. 16, 2008

(65) Prior Publication Data

US 2008/0311439 A1 Dec. 18, 2008

(30) Foreign Application Priority Data

Jun. 15, 2007 (FR) ...................... 07 04258

(51) Int. Cl.
H01M 8/04 (2006.01)
H01M 8/06 (2006.01)
H01M 8/10 (2006.01)

(52) U.S. Cl.
CPC ...... *H01M 8/04395* (2013.01); *H01M 8/04164* (2013.01); *H01M 8/04179* (2013.01); *H01M 8/04223* (2013.01); *H01M 8/04253* (2013.01); *H01M 8/04291* (2013.01); *H01M 8/0491* (2013.01); *H01M 2008/1095* (2013.01); *H01M 2250/20* (2013.01); *Y02E 60/50* (2013.01); *Y02T 90/32* (2013.01)

(58) Field of Classification Search
CPC ............... H01M 8/04156; H01M 8/04223; H01M 8/04253; H01M 8/04291
USPC ......................... 429/429, 414, 415
See application file for complete search history.

(56) References Cited

U.S. PATENT DOCUMENTS

| 4,226,919 | A | 10/1980 | Stiiwe |
| 6,068,942 | A | 5/2000 | Strasser et al. |
| 6,358,637 | B1 * | 3/2002 | Fuss ............................. 429/429 |
| 6,558,824 | B1 * | 5/2003 | Muchnic et al. .............. 429/434 |
| 7,901,821 | B2 * | 3/2011 | Buchi et al. ................... 429/429 |
| 2001/0055707 | A1 | 12/2001 | Roberts et al. |
| 2002/0150809 | A1 * | 10/2002 | Hammerschmidt et al. ..... 429/34 |
| 2005/0208358 | A1 * | 9/2005 | Nishimura et al. ............. 429/34 |
| 2007/0166582 | A1 | 7/2007 | Okamoto |
| 2007/0193340 | A1 | 8/2007 | Yoshida |

FOREIGN PATENT DOCUMENTS

| DE | 10059393 | A1 | 6/2002 |
| EP | 1338068 | A2 * | 8/2003 |
| FR | 2 873 498 | A | 1/2006 |

(Continued)

OTHER PUBLICATIONS

Bette et al., Machine translation of EP 1338068 A2 (Aug. 2003) and/or WO 0245247 A2 (as available).*

*Primary Examiner* — Sean P Cullen  
(74) *Attorney, Agent, or Firm* — Cozen O'Connor

(57) ABSTRACT

A shut-down procedure for an electricity delivery system comprising a fuel cell, the cell being fed with pure oxygen as oxidant and delivering an electrical voltage to an electrical power line. The electricity delivery system comprises a fuel gas circuit on the anode side, and a pure oxygen circuit on the cathode side. The shut-down procedure comprises the steps of an initial step during which the oxygen gas feed is interrupted, and an electrical consumption phase during which a hold current is drawn from the fuel cell until the pressure in the oxygen circuit reaches the water vapor pressure.

6 Claims, 3 Drawing Sheets

(56) References Cited

FOREIGN PATENT DOCUMENTS

| WO | WO 0245247 A2 * | 6/2002 |
| WO | WO 2005/078845 | 8/2005 |
| WO | WO 2005/088756 A1 | 9/2005 |
| WO | WO 2006/012954 | 2/2006 |
| WO | WO 2006/064893 A2 | 6/2006 |

* cited by examiner

FUEL CELL SHUT-DOWN PROCEDURE INCLUDING VAPORIZATION PHASE

RELATED APPLICATIONS

This application claims priority of French application no. 07/04258 filed Jun. 15, 2007, the content of which is hereby incorporated by reference.

FIELD OF THE INVENTION

The present invention relates to fuel cells, especially to automotive applications of fuel cells.

BACKGROUND OF THE INVENTION

It is known that fuel cells allow electrical energy to be produced directly by an electrochemical oxidation-reduction reaction from hydrogen (the fuel) and oxygen (the oxidant), without conversion to mechanical energy taking place. This technology seems promising, especially for automotive applications. A fuel cell generally comprises a series of individual elements, each of which essentially consists of an anode and a cathode separated by a polymer membrane that allows ions to pass from the anode to the cathode.

As regards the fuel, either there is a hydrogen supply available or hydrogen is produced necessarily close to the fuel cell by means of a reformer which is itself fed for example with a hydrocarbon. As regards the oxidant, either the fuel cell is fed with compressed atmospheric air, and the excess gas in which the proportion of oxygen has decreased is discharged downstream of the fuel cell, or the fuel cell is fed with pure oxygen. The latter solution has a number of advantages, especially a more dynamic response of the cell to a current demand, this being particularly advantageous in the case of applications in transport vehicles, such as motor vehicles, which are known to impose particularly intermittent operating conditions, unlike in stationary applications. We should also mention, as advantages of a fuel cell being fed with pure oxygen, that the efficiency and power density are better and that there is no contamination by pollutants contained in the However, in this case, the shut-down of the cell is not immediate as the system cannot profit from the asphyxiating effect of the nitrogen present in air. The electrochemical reaction cannot be completely interrupted by simply shutting off the fuel and oxidant feed valves. This is because the amount of oxygen and hydrogen remaining trapped within the respective channels of the fuel cell is sufficient to sustain the electrochemical reaction and there is a risk that this reaction will persist for several hours. Consequently, an electrical voltage persists across the terminals of the fuel cell to the detriment of safety. In the case of a fuel cell of the PEFC (Polymer Electrolyte Fuel Cell) type, maintaining a voltage without external current consumption (i.e. an open circuit voltage) involves mechanisms that cause the membrane to be rapidly degraded.

Patent Application WO 2005/088756 A1 describes a procedure for detecting leaks by measuring a change in pressure during shut-down of the cell. The pressure of the system may be varied by means of a recycling pump.

Patent Application WO 2005/078845 A2 proposes a procedure called "catalyst degradation suppressing", for extinguishing a cell operating with hydrogen and air. To limit the catalyst degradation mechanisms appearing at full potential, the cell is shut down within a minimum time by drawing a substantial current so as to cause a rapid drop in voltage. During the cut-off procedure, the air feed is interrupted, while the hydrogen feed is maintained and the pressure appears to be controlled by means of the current. The cut-off procedure is designed to prevent hydrogen underfeed. A resistance is used to consume the waste gas. This is a cut-off procedure for an air fuel cell, the cathode circuit is vented to atmosphere during cut-off and a hydrogen feed is maintained during cut-off.

Patent Application WO 2006/064893 describes another cut-off procedure for an air fuel cell. Firstly, the hydrogen feed is interrupted, then a current is applied and, when the pressure drops slightly below atmospheric pressure, the hydrogen feed is maintained so as to keep the pressure at this level. On the cathode side, the air feed is firstly maintained so as to allow dilution of any hydrogen leaks via the purge valve and then it is interrupted until the oxygen is consumed. Many arrangements are provided for preventing hydrogen leaks at the valves. In the final embodiment presented, a complex calculation is proposed for maximizing the cut-off current as a function of the load capacity, the hydrogen concentration, the oxygen concentration and the voltage distribution. According to a comment on page 20, lines 22 to 26, all precautions are taken to prevent the pressure from dropping below a certain threshold as, according to this teaching, this would be prejudicial to the ion-exchange membrane.

Patent Application DE 100 59 393 describes a cut-off method for a fuel cell fed with pure hydrogen and pure oxygen. This Patent Application describes the following sequence: firstly the oxygen feed is cut off and then a variable electrical load is used to draw a current that causes the hydrogen/oxygen reaction to continue in the fuel cell. Next, when the oxygen pressure has dropped below a predetermined threshold, the hydrogen and oxygen circuits are flushed with nitrogen down to a predetermined pressure. This causes the fuel cell to shut down. However, this solution requires a reserve of nitrogen being available. Furthermore, the subsequent start-up of the fuel cell is ineluctably disturbed by the presence of nitrogen in the gas circuits.

Patent Application WO 2006/012954 also proposes a method of cutting off a fuel cell fed with pure hydrogen and pure oxygen. Unlike Patent Application DE 100 59 393, Patent Application WO 2006/012954 proposes at the end of the cut-off phase to flush the cathode circuit with atmospheric air (and not with inert gas), thereby benefiting from the asphyxiating effect of the nitrogen in air without having to have pure nitrogen and proposes to regulate the anode circuit so as to bring the hydrogen pressure gradually down to a level close to atmospheric pressure.

Although this solution does effectively achieve rapid and controlled shut-down of the fuel cell, without having to have recourse to a nitrogen feed, the shut-down cell is in a configuration such that some water remains, especially in the cathode circuit, which, a problem well known in fuel cells, makes it sensitive to icing and makes start-up problematic at a temperature below 0° C.

U.S. Pat. No. 6,068,942 proposes to cut off a fuel cell, fed either with oxygen or with ambient air delivering oxygen, by firstly interrupting the oxygen feed and then, when the oxygen partial pressure is below 0.5 bar, the hydrogen feed is interrupted. U.S. Pat. No. 4,226,919 proposes an arrangement of pneumatic valves for ensuring that: i) the hydrogen is introduced before the oxygen in start-up phase; ii) the oxygen is interrupted before the hydrogen in cut-off phase; iii) the oxygen feed is automatically interrupted should the hydrogen pressure drop during operation; and iv) the two circuits are flushed with hydrogen at rest.

Patent Application US 2001/0055707 proposes a system for purging the oxygen and hydrogen circuits with nitrogen during the cut-off phase so as to allow storage at low temperature (<0° C.).

SUMMARY OF THE INVENTION

One object of the invention is to achieve controlled and rapid shut-down of the fuel cell, without necessarily having to have a nitrogen feed, that is to say to stop the internal electrochemical processes so that the overall voltage across the terminals of the fuel cell effectively drops to close to zero and so that there is no longer any consumption of gas and so that the cell is in a state that remains favourable to subsequent rapid start-up, even at very low temperature.

Unlike the proposals mentioned above, it is proposed here not to compensate for gas consumption, and therefore to let both circuits reach high partial vacuum levels. In fact, none of the documents known from the prior art proposes exploiting the partial vacuum appearing on cutting off a fuel cell, rather, on the contrary, the prior art proposes to prevent the development, or the maintaining over a significant period of time, of a partial vacuum in the gas circuits when shutting off a fuel cell.

One aspect of the present invention is directed to a shut-down procedure for an electricity delivery system comprising a fuel cell, the cell being fed with pure oxygen as oxidant and delivering an electrical voltage to an electrical power line, the system comprising:
  a fuel gas circuit on the anode side; and
  a pure oxygen circuit on the cathode side,
and the shut-down procedure comprising the steps of:
  an initial step during which the oxygen gas feed is interrupted; and
  an electrical consumption phase during which a hold current is drawn from the fuel cell until the pressure in the oxygen circuit reaches the water vapour pressure.

The current drawn from the fuel cell during the cut-off phase causes the waste gas to be consumed, thereby tending to considerably reduce the pressure below atmospheric pressure. For sufficiently sealed fuel cells, it may be advantageous to attain, in the gas circuits of the cell, pressure levels equal to the vapour pressure of water, i.e. for example about 0.2 bar (absolute pressure) at 60° C. and around 0.05 bar (absolute pressure) at 30° C.

The water present in the cell channels vaporizes, in a vaporization phase, as soon as the level of partial vacuum reaches the vapour pressure of water corresponding to the actual temperature at the moment. It becomes easy to remove this water from the cell by means of water separators already present in the system. To do this, it is necessary to force the water vapour to pass into the water separator, for example by means of the recirculation pump already present in the system. Consequently, the cell is prepared for remaining at high negative temperatures without damage to the electrodes and the membranes of the fuel cell. Vaporization of the water also tends to guarantee that the membranes are uniformly humidified, this being conducive to good electrical performance. Furthermore, owing to the absence of inert gas after cutting off the fuel cell, the latter is in a configuration propitious to rapid start-up. In addition, owing to the persistence of a minimum amount of released gas (hydrogen+oxygen), the electrochemical degradation mechanisms operating on the membrane and the electrodes are prevented.

In practice, it is quite difficult to obtain complete consumption of both gases simultaneously: with the fuel cell shut down, there will necessarily remain a certain amount of oxygen on the cathode side or hydrogen on the anode side and no longer able to react. It is preferable to favour excess hydrogen (or more generally, excess fuel gas) for the following reasons:
  the water to be removed is predominantly on the cathode side, so that it is therefore preferable to consume all the oxygen in order to guarantee vaporization of the water thanks to a minimum pressure; and
  the combination of the following three conditions: 1) underfeed or absence of hydrogen on the anode side; 2) presence of oxygen on the cathode side; and 3) maintenance of a current, is responsible for inducing degradation mechanisms, especially rapid corrosion of the carbon generally used as support for the catalyst.

For this purpose, the procedure for cutting off the fuel cell may be controlled in two ways: either the interruption of the fuel gas feed is delayed with respect to the interrupting of the oxygen feed, so as to guarantee that all the oxygen is consumed before the fuel gas, or the pure oxygen and fuel gas feeds are interrupted simultaneously, and preferably a purge of some of the oxygen to the ambient environment is effected. It is this latter variant that will be described in greater detail below.

In the rest of the description, the invention is illustrated by considering a fuel cell of the type having an electrolyte in the form of a polymer membrane (i.e. a PEFC standing for Polymer Electrolyte Fuel Cell). This constitutes a favourable embodiment for applications in transport vehicles, particularly motor vehicles, but is in no way limiting. One drawback of the fact that the cell is not shut down immediately is that the system for cooling the fuel cell has to be kept active for a long time after the vehicle has been stopped, otherwise there is a risk of hot spots injurious to the polymer membrane appearing. In addition, maintaining an open-circuit voltage produces rapid degradation mechanisms in the membrane. The shut-down procedure proposed by the present invention is most particularly capable of eliminating these drawbacks for this type of fuel cell.

DETAILED DESCRIPTION OF THE DRAWINGS

Figure 2:
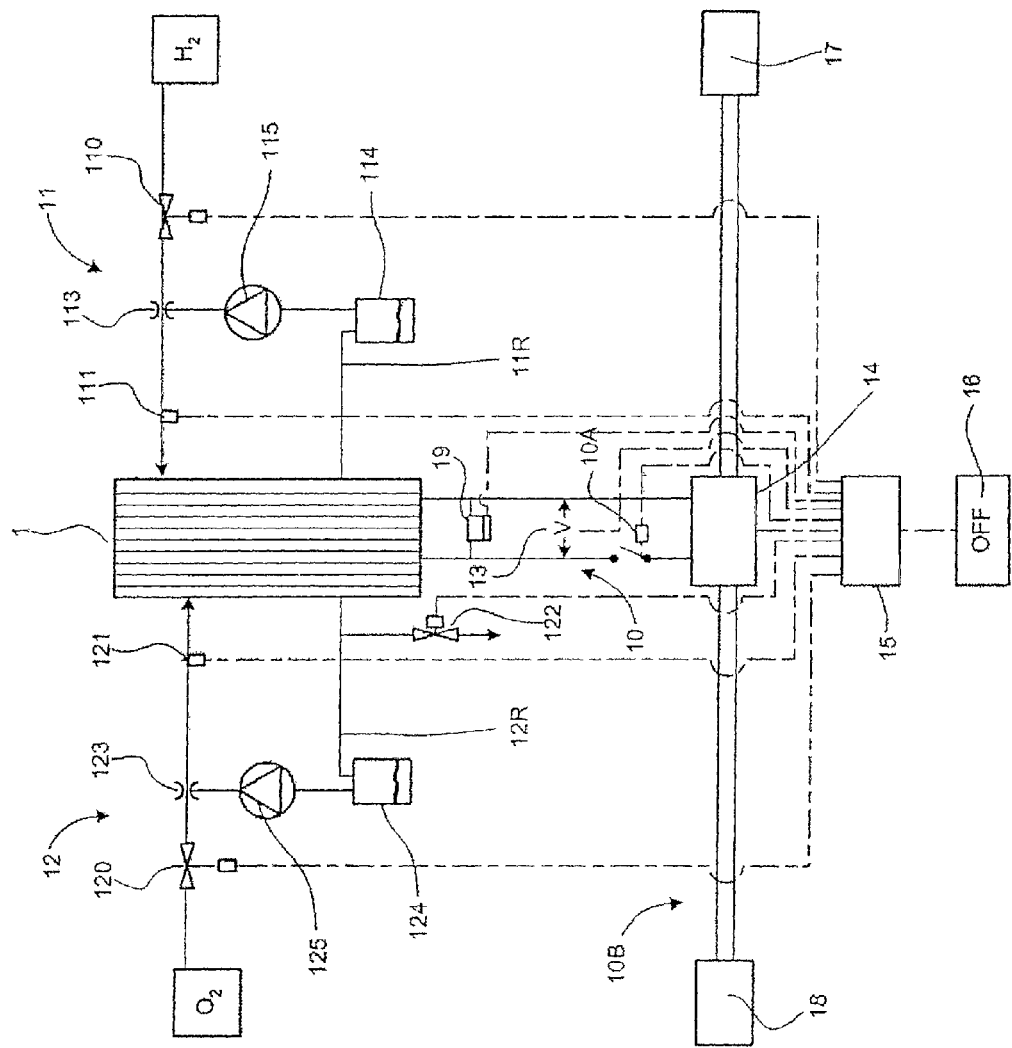
FIG. 2 is a diagram of an electric power production system using a fuel cell fed with pure oxygen.

FIG. 2 shows a fuel cell 1 of the type having an electrolyte in the form of a polymer membrane (i.e. of the PEFC type). The fuel cell 1 is supplied with two gases, namely the fuel (either stored hydrogen or hydrogen generated on board the vehicle) and the oxidant (pure oxygen), which feed the electrodes of the electrochemical cells. To simplify matters, FIG. 2 shows only the elements of the gas circuits useful for understanding the invention.

The installation comprises a fuel gas circuit 11 on the anode side. The figure shows a tank of pure hydrogen $H_2$ connected to the inlet of the anode circuit of the fuel cell 1 by means of a feed line that runs through a hydrogen feed valve 110 and then through an ejector 113. A pressure sensor 111 is installed in the line just before the inlet into the fuel cell 1. A recycling circuit 11R is connected to the outlet of the anode circuit of the fuel cell 1. The ejector 113 and a recirculation pump 115 are used to recycle the unconsumed gas through a water separator 114 and to mix it with the fresh gas coming from the tank.

The installation also comprises an oxidant gas circuit 12 on the cathode side. The figure shows a tank of pure oxygen $O_2$ connected to the inlet of the cathode circuit of the fuel cell 1 by means of a feed line that runs through an oxygen feed valve 120 and then through an ejector 123. A pressure sensor 121 is installed in the line just before the inlet into the fuel cell 1. A recycling circuit 12R is connected to the outlet of the cathode circuit of the fuel cell 1. The ejector 123 and a recirculation pump 125 are used to recycle the unconsumed gas through a water separator 124 and to mix it with the fresh gas coming from the tank. Just at the gas outlet of the fuel cell 1 there is a purge valve 122 for venting the oxygen circuit to atmosphere.

The fuel cell 1 is connected to an electric power line 10 to which it delivers a DC electric voltage. FIG. 2 shows a switch 10A for isolating the fuel cell and an electrical load connected to the electric power line 10. The fuel cell 1 delivers a DC electrical current to an electric power management unit 14 (see FIG. 2). The DC electrical current delivered by the fuel cell is measured in the electric power management unit 14. The electric power management unit 14 is connected on one side to a load 18 formed by the intended application, for example an electric traction module for a motor vehicle, essentially consisting of a DC/AC converter and an electrical machine mechanically coupled to one or more drive wheels (not shown) of a motor vehicle. The electric power management unit 14 is also connected to another electrical load, such as for example a bank of super capacitors 17.

Thus, the fuel cell 1 can deliver electricity to the intended application (load 18) or to the bank of super capacitors 17, or to both applications. The bank of super capacitors 17 may receive electrical energy and store it, or it may deliver electrical energy to the electric traction module (load 18). The electric power management unit 14 regulates the circulation of power according to the commands made by the driver of the vehicle or according to the state of the electricity delivery system.

Furthermore, to be able under all circumstances to draw the hold current needed for the fuel cell cut-off procedure, a resistor 19 associated with an electronic variator is connected directly to the terminals of the fuel cell, i.e. upstream of the switch 10A.

The fuel cell 1 is controlled by a control unit 15. This control unit 15 receives information from the absolute pressure sensors in the hydrogen circuit (sensor 111) and in the oxygen circuit (sensor 121), from a device 13 for measuring the voltage that exists in the electric power line 10 and from a tripping member 16 (for example a contact key) for the shut-down procedure. The control unit also controls the operation of the various valves (110, 120, 122).

Figure 1:
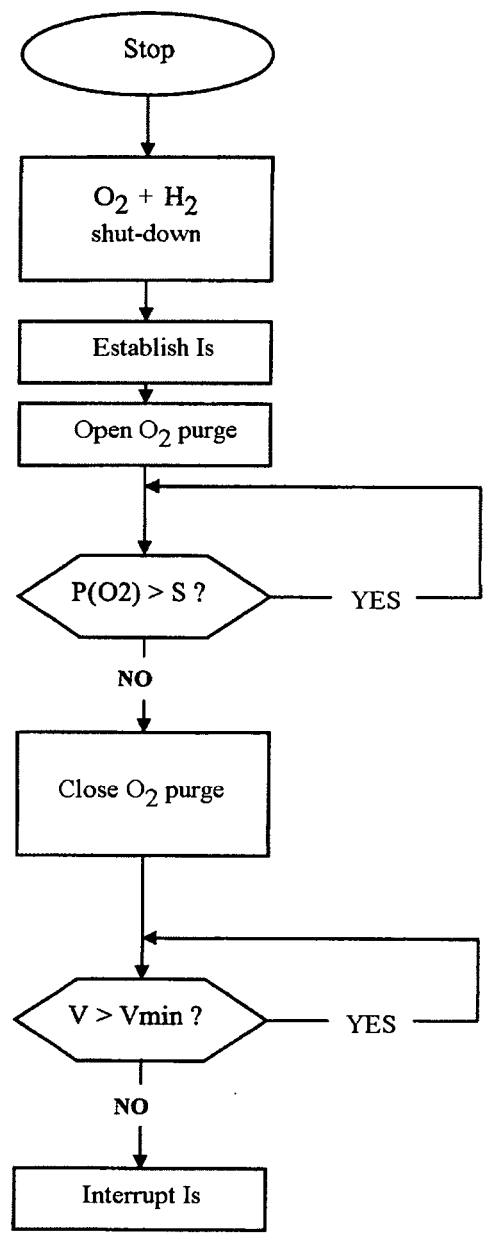
FIG. 1 is a block diagram of the shut-down procedure for a fuel cell fed with pure oxygen.

FIG. 1 illustrates the sequence of proposed operations for a well-controlled shut-down of the fuel cell 1. The driver, via a key or a switch, or any safety system for monitoring the vehicle, sends a signal requesting the shut-down of the fuel cell to the control unit 15. Upon receiving the shut-down signal, the initial step causes the oxygen and hydrogen feed valves to be closed. For this purpose, the control unit 15 of the fuel cell 1 sends an electrical signal for closing the oxygen feed valve 120 and for closing the hydrogen feed valve 110. FIG. 1 illustrates one particular procedure for controlling the shut-down of a fuel cell fed with pure oxygen, in accordance with the invention, the "$O_2+H_2$ shut-down" action representing this initial step.

The control unit 15 of the fuel cell 1 checks that a small current Is, but one which is sufficient to consume the gas remaining in the channels of the cell, is established, this being represented by the "establish Is" block in FIG. 1. As it is possible for the load 18 and the bank of super capacitors 17 not to be able to absorb a current, the control unit 15 controls the electronic contactor of the resistor 19 so as to be certain that the current Is required by the cut-off procedure can always be absorbed. Optionally, the current Is may be adjusted according to the state of the cell (temperature, voltage distribution between all the cell elements, etc.). The use of this current Is will be described later.

The pressure will tend towards the temperature-dependent pressure of water vapour. By means of appropriate constructional measures, such as the use of metal bipolar plates, the sealing of a fuel cell is excellent and it is possible to achieve pressure levels of around 200 mbar at 60° C., i.e. 50 mbar at 30° C.

To guarantee a slight excess of hydrogen at the end of the cut-off procedure, the control unit 15 of the fuel cell causes the $O_2$ purge valve to open, represented by the "open $O_2$ purge" action. When the pressure in the cathode circuit reaches a level S, determined so as to guarantee that all the oxygen is consumed before the hydrogen, the control unit 15 causes the $O_2$ purge valve to close, represented by the "close $O_2$ purge" action.

Finally, when the voltage V across the terminals of the fuel cell is below said threshold $V_{min}$, the control unit 15 of the fuel cell 1 executes the final step: the delivered current drawn from the cell is interrupted. When the cell voltage has dropped to a sufficiently low level, the cell may be considered to be shut down.

Preferably, resistors (not shown, for example of 50 ohms) are permanently connected to each cell element or group of two or three cell elements of the fuel cell so as to consume, without fail, the possible gas residues and prevent the voltage from rising after cut-off.

Another advantage of the shut-down procedure proposed by the invention is that the fuel cell when shut off is in a configuration propitious for rapid start-up.

Figure 3:
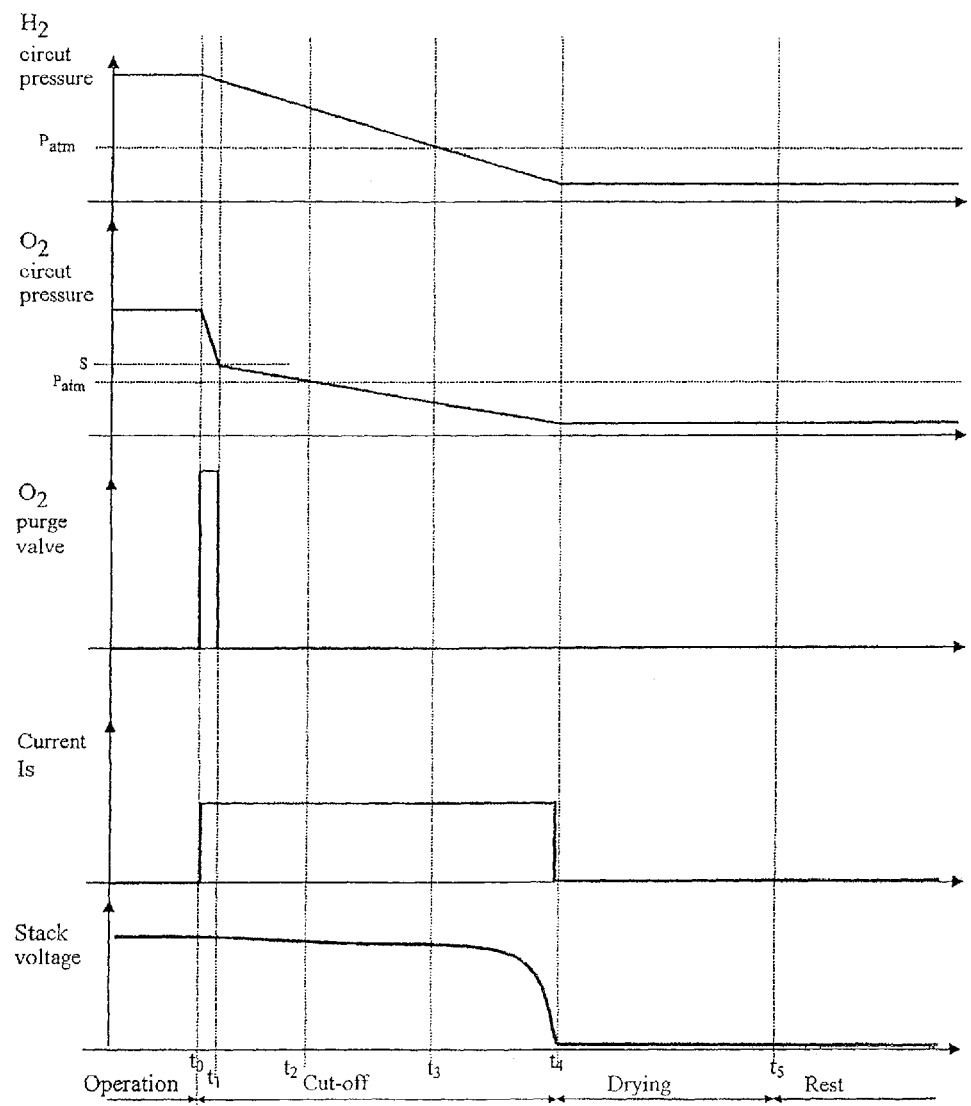
FIG. 3 shows several timing diagrams illustrating the shut-down of a fuel cell fed with pure oxygen.

The curves in FIG. 3 illustrate the variation of a few parameters while the fuel cell 1 is being cut off using this procedure. The order to start the shut-down procedure occurs at $t_0$ (initial step). The first two curves illustrate the variation of the pressure in the anode circuit and in the cathode circuit respectively. The fourth curve indicates that a current of value Is is drawn from the cell after a certain instant and persists up to $t_4$ (final step) at which moment the cut-off procedure is complete. At time $t_0$, the third curve indicates that the purge valve of the cathode circuit is open and remains so until the pressure in the cathode circuit—second curve—reaches the threshold S at $t_1$. Beyond $t_1$, the two circuits are closed and the reduction in gas pressure is solely due to the fact that an electrical current continues to be absorbed.

If the volume of the anode circuit and that of the cathode circuit are identical, taking into account the stoichiometric relationship, the gas consumption is about twice as high on the hydrogen side. The oxygen pressure (second curve giving $P(O_2)$) becomes below atmospheric pressure at time $t_2$. The hydrogen pressure (first curve giving $P(H_2)$) becomes below atmospheric pressure at time $t_3$.

The threshold S defining the residual pressure in the cathode circuit after the purge (time $t_1$) is defined so that the oxygen is completely consumed before the hydrogen, so as to avoid conditions whereby current is drawn simultaneously with a hydrogen underfeed, resulting in corrosion of the carbon used as support for the catalyst associated with the polymer membranes. At time $t_4$, the oxygen is completely consumed and the residual pressure in the cathode circuit corresponds to the pressure of water vapour. The voltage present on the fuel cell (fifth curve, giving the voltage of the fuel cell) is then close to zero, the cell being considered cut off. There then follows a drying phase, between times $t_4$ and $t_5$, during which the water present in vapour form in the cathode circuit can be easily removed, for example by starting the recirculation pump so as to promote condensation of the water vapour in the water separator present in the recirculation line.

Preferably, if required, so that the vehicle is stopped with a maximum reserve of electrical energy in the bank of super capacitors, after the shut-down member has been activated and before the oxygen and hydrogen feed valves are closed, a check is made of the level of charge of the electrical energy storage device and, provided that this is below a high threshold, the cell is kept in operation and the energy management unit is switched to a recharge mode, for recharging the electrical energy storage device, then, when the level of charge is equal to or above said high threshold, the oxygen and hydrogen feed valves are closed. This is very useful when the vehicle is subsequently restarted.

The invention claimed is:

1. A shut-down procedure for an electricity delivery system comprising a fuel cell, the fuel cell being fed with pure oxygen as oxidant from a pure oxygen circuit on the cathode side and hydrogen from a fuel gas circuit on the anode side and delivering an electrical voltage to an electrical power line, the shut-down procedure comprising:
   an initial step during which the oxygen gas feed is interrupted;
   an electrical consumption phase during which a hold current is drawn from the fuel cell until the pressure in the oxygen circuit is reduced to the vapor pressure of water at the temperature of the fuel cell; and
   a vaporization phase during which water present in channels of the fuel cell is vaporized by pressure reduction produced in the electrical consumption phase.

2. The shut-down procedure according to claim 1, wherein an interruption of the fuel gas feed is delayed relative to the interrupting of the oxygen feed so as to guarantee that all of the oxygen is consumed before the fuel gas.

3. The shut-down procedure according to claim 1, the fuel cell comprises an electrolyte including a polymer membrane.

4. The shut-down procedure according to claim 1, performed for a system installed in a vehicle.

5. The shut-down procedure according to claim 1, wherein the pure oxygen and fuel gas feeds are interrupted simultaneously.

6. The shut-down procedure according to claim 5,
   wherein the pure oxygen circuit on the cathode side is vented to atmosphere, and
   wherein the procedure, at the start of the electrical consumption phase, brings the oxygen circuit into communication with the atmosphere or with an inert gas, until the pressure in the oxygen circuit drops to a predetermined pressure S above atmospheric pressure, guaranteeing that all the oxygen is consumed before the hydrogen.

* * * * *